Aug. 5, 1969  W. C. PRIOR  3,459,146
HYDROFOIL WATERCRAFT
Filed May 19, 1967  3 Sheets-Sheet 1
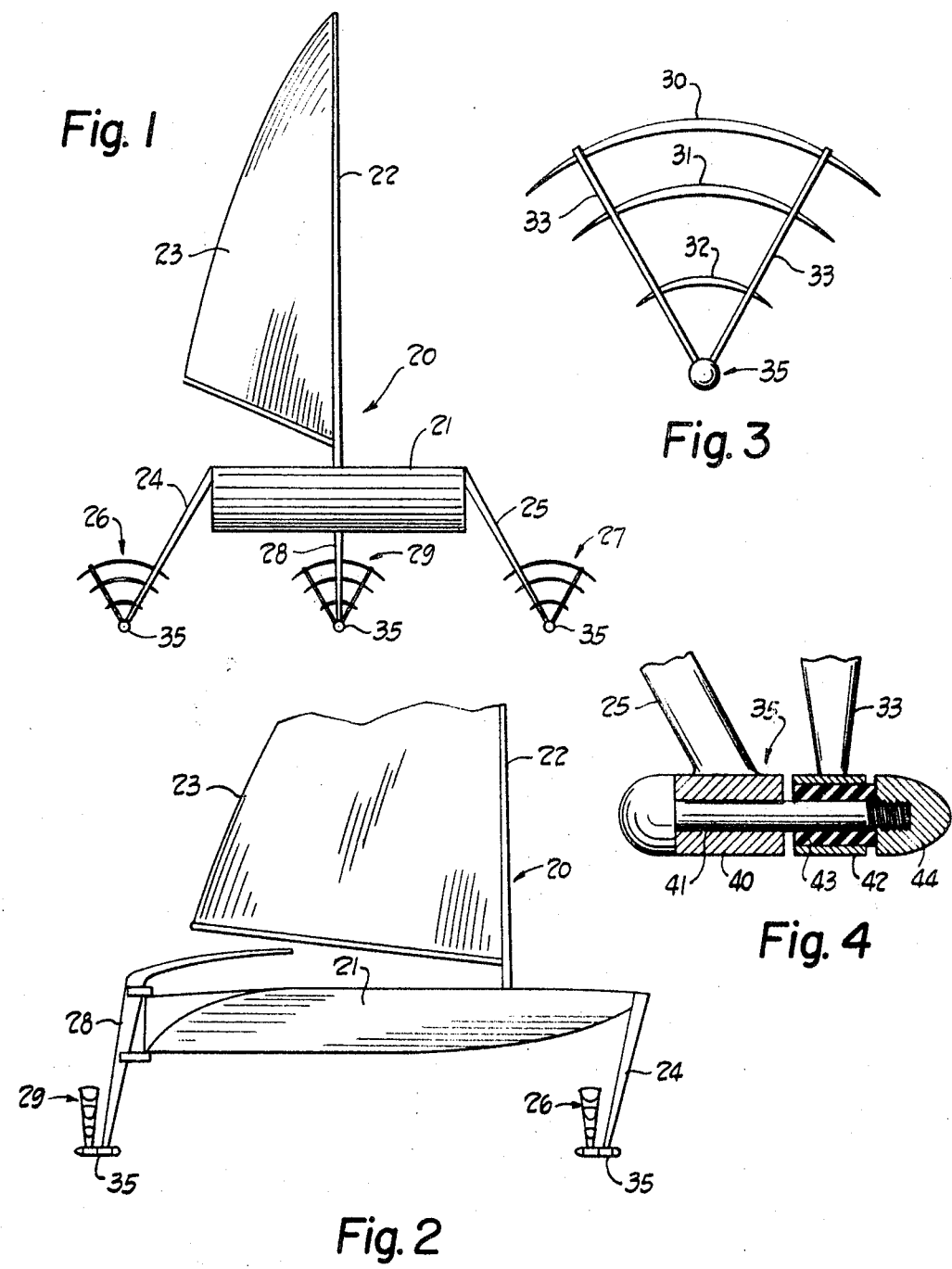
INVENTOR.
WILLIAM C. PRIOR
BY Watts, Hoffmann,
Fisher & Heinke
ATTORNEYS.

Aug. 5, 1969  W. C. PRIOR  3,459,146
HYDROFOIL WATERCRAFT
Filed May 19, 1967  3 Sheets-Sheet 2

INVENTOR.
WILLIAM C. PRIOR
BY Watts, Hoffmann,
Fisher & Heinke
ATTORNEYS.

Aug. 5, 1969    W. C. PRIOR    3,459,146
HYDROFOIL WATERCRAFT
Filed May 19, 1967    3 Sheets-Sheet 3

INVENTOR.
WILLIAM C. PRIOR
BY Watts, Hoffmann,
Fisher & Heinke
ATTORNEYS

United States Patent Office 3,459,146
Patented Aug. 5, 1969

3,459,146
HYDROFOIL WATERCRAFT
William C. Prior, 348 N. Cleveland,
Chagrin Falls, Ohio 44022
Filed May 19, 1967, Ser. No. 639,904
Int. Cl. B63b *1/28*
U.S. Cl. 114—66.5                                           16 Claims

ABSTRACT OF THE DISCLOSURE

In a hydrofoil watercraft, a balanced, self-correcting hydrofoil assembly including a foil element and structure mounting the foil element for free pivotal movement so that the element can seek and maintain an angle of incidence which produces the designed lift to drag ratio of the assembly, and/or so that the foil element can seek the dihedral angle which is most efficient to support and stabilize the craft.

BACKGROUND OF THE INVENTION

This invention relates generally to hydrofoil supported watercraft, and more specifically to a balanced, self-correcting hydrofoil assembly which is particularly suited for supporting sailing craft.

In an ideal system for supporting a boat on hydrofoils, each foil is positioned so that it moves through the water at an angle of attack which produces the best lift to drag ratio of the foil, and so that the dihedral angle is such as to produce a resultant lift vector in the best direction for stabilizing and supporting the boat under any given conditions. At the same time, the system should have a light-weight, durable, simple and inexpensive construction which has the least possible amount of wind and water drag.

The ideal hydrofoil system is not easily achieved because of several problems inherent in its construction and operation. The flying height of a hydrofoil system must be closely controlled in order to prevent the craft from falling into the water. Control of a hydrofoil system is difficult, since relatively small variations in the angle of attack of a foil will produce erratic effects on its performance. This is because the forces caused by small changes in the angle of attack are very high due to the high density of water.

The control and performance of a hydrofoil system is further complicated by a constantly varying angle of attack or incidence produced by the vertical motion of the water and the waves added vectorially to the motion of the foil on its course. Every hydrofoil system has a single, optimum angle of attack or incidence which will result in the lift to drag ratio which is predetermined by the design of the system. The constant variations in the angle of attack which are encountered in use substantially lessen the efficiency of the foil and produce additional problems of cavitation and ventilation that further decrease the efficiency of the foil.

Another problem in the design and operation of an ideal hydrofoil system is that of maintaining the correct foil area in the water which will result in an optimum lift to drag ratio. The foil area required to efficiently support the watercraft is inversely proportional to the square of its speed. Since watercraft are generally required to operate at varying speeds, the submerged foil area must be correspondingly varied. Any changes in the balance of the watercraft caused by weight distribution, changes in course, wind currents, etc. also must be sensed and corrected for by the ideal system.

The foregoing problems are particularly serious in a hydrofoil supported sailboat, since the hydrofoil system must resist leeway and heeling, as well as being self-balancing or stabilizing.

In many conventional hydrofoil systems, the foregoing problems are ignored and the foils are mounted in a fixed relationship to the hull of the watercraft. Fences and sweepback on the foils have been resorted to in attempts to alleviate the problems of ventilation and cavitation. At best these expedients greatly reduce the lift to drag ratio of the foils and require extra power to keep the craft foil-borne. Other attempts have been made to use sophisticated control systems including either mechanical or electronic sensing devices to determine the craft's position over the water and, in turn, to control the angles of incidence of the various foils. These control systems have often included gyros and high performance auto pilots. Such systems are expensive and are not applicable to anything but the very largest hydrofoil craft. With particular regard to sailboats, none of the known hydrofoil systems have combined simplicity in construction with high performance and efficiency as is necessary to provide an ideal foil system.

In applying hydrofoils to sailboats, it has been a conventional practice to incline the foils inwardly and downwardly at a fixed, relatively large dihedral angle. The purpose of this conventional arrangement was to obtain a positive lift force on the lee foil and a negative force on the windward foil, thereby counteracting the heeling moment as well as providing roll stability. Such an arrangement has two major disadvantages. Any given dihedral angle is merely a compromise of the wide variation in angle required for the various points of sailing. Secondly, the horizontal lift vectors of the two foils are in opposite directions under normal sailing conditions and tend to cancel one another out, thus producing only drag.

A second conventional approach has been to incline the foils in the same direction. While this arrangement overcomes the problem of cancellation of force vectors, it is only a compromise of the required dihedral angle and has a major disadvantage in that the craft can sail in only one tack and can neither go downward nor about.

It has also been proposed to provide a sailing craft with foils in which the dihedral angle can be changed to suit different sailing conditions. These conventional systems in which the dihedral angle can be changed are relatively complicated and have not included any provision for changing the angle of incidence. Further, the systems have not been operable automatically to change the dihedral angle under all conditions of sailing.

SUMMARY OF THE INVENTION

The present invention satisfies the foregoing criteria required of a high performance hydrofoil system and overcomes the disadvantages and shortcomings of prior foil arrangements. The new hydrofoil system of the invention is characterized by automatic incidence and/or dihedral control. The automatic incidence and dihedral control is effective to obtain the optimum lift to drag ratio of the foil elements and to produce resultant force vectors which are in the ideal direction necessary to support and stabilize the watercraft with maximum efficiency. Although suitable for many types of watercraft, the new system is particularly well adapted for sailing craft which have a limited power supply. When used to support a sailboat, the force vectors of the automatically variable foils are effective to resist leeway, heeling and pitching moments which vary widely from one point of sailing to another and constantly change in magnitude depending upon the relative wind direction, etc.

The new hydrofoil system of this invention is further characterized by its simplicity as well as by its improved performance. As will be apparent from the following description, the new foil arrangement does not require the sophisticated control systems of the prior art. The new foil arrangement can be embodied in sailing craft in a manner which is neither cumbersome nor complicated and which produces the least amount of wind and water drag. At the same time, the new foil system does not interfere with and restrict sailing maneuvers.

The hydrofoil system of the invention is based on a recognition that a foil can be operatively suspended in somewhat the same manner as a kite is suspended on a string, wherein the lift and drag forces on the kite are balanced in stable equilibrium with the pull of the string. In the preferred embodiment a suitable foil element is attached to a tension strut. The assembly of the foil and the tension strut is pivotally connected to a supporting member so that the foil can freely move about an effective pivot point located below it. The optimum angle of incidence and the optimum lift to drag ratio of the hydrofoil assembly are predetermined by the construction of the foil, the suspension strut and the pivot connection. In the preferred arrangement, the hydrofoil assembly is free to pivot so that it automatically seeks and maintains the correct angle of incidence which produces the design ratio regardless of other conditions. Since the designed lift to drag ratio is maintained simply and automatically, the invention provides substantial advantages over prior hydrofoil arrangements.

In the preferred construction, the hydrofoil assembly is also free to pivot dihedrally. The tension strut and foil assemby automatically pivots about an axis parallel to the roll axis of the boat to seek a dihedral angle in which the resultant lift vector applied by the assembly through the effective pivot point is equal and opposite to the force applied by the boat through the effective pivot point. Regardless of the point of sailing, the hydrofoil assembly will assume the dihedral angle which is most efficient for any given set of conditions.

As used in the following description and claims, the term "dihedral angle" will be understood to mean the angle between the plane containing the longitudinal roll axis and the lateral pitch axis of the craft and a line drawn spanwise between the tips of a foil element.

DESCRIPTION OF THE DRAWING

FIGURE 1 is a front elevational view of a single hull sailboat embodying the preferred hydrofoil system of this invention;

FIGURE 2 is a side elevation of the sailboat shown in FIG. 1;

FIGURE 3 is an enlarged view of a preferred hydrofoil assembly;

FIGURE 4 is an enlarged, fragmentary view, partially in cross section of a preferred pivot connection for the hydrofoil assembly;

DESCRIPTION OF THE PREFERRED EMBODIMENTS

Figure 5:
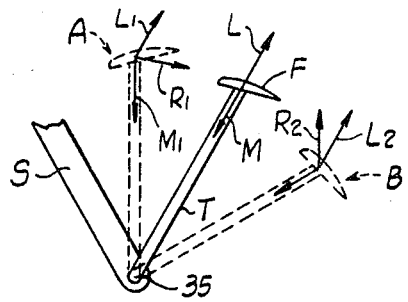
FIGURE 5 is a schematic illustration showing the manner in which the hydrofoil assembly moves to change the angle of incidence.

Although the new hydrofoil system of this invention is shown in the drawings embodied in a single hull sailboat, it is to be understood that the invention is not limited to any particular watercraft or hull construction and that the illustrated craft has been chosen only for the purpose of clearly expaining to those skilled in the art one operative embodiment. As will be readily apparent, the new hydrofoil system can be embodied in multiple hull sailing craft, power boats, and in so-called "hull-less" watercraft.

Referring now to the drawings, and to FIGS. 1–4, in particular, the diagrammatically illustrated sailing craft embodying the present invention is generally designated by reference numeral 20. The craft 20 is shown as including a hull 21, a mast 22 and a sail 23. A pair of support members or struts 24, 25 extend downwardly from the starboard and port sides, respectively, of the hull 21 near its forward end, and hydrofoil assemblies 26, 27 constructed in accordance with the invention are respectively connected to the members 24, 25. Steering control of the craft 20 is afforded by a suitably mounted rudder 28. The rudder 28 also functions as a support strut and carries an aft hydrofoil assembly 29 which is mounted and constructed in the same manner as the assemblies 26, 27.

The preferred hydrofoil assemblies 26, 27, 29 are of the surface-piercing class. As shown, each of the surface-piercing hydrofoil assemblies is in the form of a ladder and is comprised of a plurality of sub-cavitating foil elements 30, 31, 32. The preferred foil elements 30, 31, 32 are elongated members having a high aspect ratio and upwardly convex span axes.

The individual foil elements 30, 31, 32 of each hydrofoil assembly are secured adjacent their ends to tension struts 33, 34. The tension struts 33, 34 converge to a pivotal connection 35 which, in the preferred embodiment of the invention is located below the undersurfaces of the foil elements. As will be more fully described, the pivotal connections 35 between the hydrofoil assemblies 26, 27, 29 and their respective supporting members 24, 25, 28 enable each assembly to pivot freely in order automatically to vary both the angle of incidence and the dihedral angle of the assembly.

A suitable construction of the pivotal connections 35 is shown in FIG. 4. The illustrated pivotal connection 35 is comprised of a collar 40 which is rigidly connected to the lower end of the support member or strut 25 extending from the hull of the craft 20. A pivot pin 41 having a head at one end extends through the collar 40 and is rotatable therein. The lower ends of the tension struts 33, 34 of the associated hydrofoil assembly are secured to a collar 42 which is carried on the pivot pin 41. As shown, a sleeve 43 of resiliently flexible material, such as rubber or the like, is mounted between the collar 42 and the pin 41. The assembly is held together by a cap nut 44 threaded on the end of the pin 41 opposite to its head. In use the pin 41 carrying the hydrofoil assembly is free to rotate in order to permit automatic changes in the dihedral angle of the foil assembly. The sleeve 43 is compressible and permits the hydrofoil assembly to move in directions fore and aft of the craft 20 in order to change its angle of incidence or attack.

As previously mentioned, every hydrofoil arrangement has a designed lift to drag ratio and an optimum angle of incidence which will produce the designed ratio. In the case of the present invention the lift to drag ratio and the proper angle of incidence is predetermined by the construction of the foil elements, the tension struts and the pivot arrangement. Since the foil and tension strut assembly is mounted for pivotal movement about a point located below the foil elements, the assembly will always seek an angle of incidence in which its lift-drag force vector passes through the pivot ponit. In use the hydrofoil assembly of the invention will seek and maintain the angle of incidence which results in the designed ratio regardless of other conditions.

The operation of the hydrofoil assembly of the invention in automatically seeking and maintaining the proper incidence angle and the designed lift to drag ratio will be readily apparent from a consideration of the schematic illustration of FIG. 5 in which the several foil elements of the assembly are represented by member F, the tension struts by member T, and the support strut by member S. For purposes of description it is assumed that the direction of water movement is from left to right, as viewed in FIG. 5. The proper angle of incidence which results in the designed lift to drag ratio determined by the construction of the system is obtained when the hydrofoil assembly is in the position shown by solid lines. In this position the lift-drag force vector L extends through the pivot point 35 and is equal and opposite to the tension strut force vector M. The assembly is thus in a balanced condition from the standpoint of the forces tending to change the angle of incidence or attack. Assuming that the vertical motion of the water added vectorially to the motion of the foil assembly on its course tend to produce an angle of incidence represented by the assembly in the broken line position A, it will be seen that the lift-drag force vector $L_1$ no longer passes through the pivot point 35. In the position A, the resultant $R_1$ of the lift-drag force vector $L_1$ and the tension strut force vector $M_1$ acts as a correcting force causing the assembly to move to the solid line position wherein the lift-drag and the tension strut force vectors are balanced. Similarly, if the particular dynamic conditions tend to produce an angle of incidence represented by the assembly in the broken line position B, the resultant $R_2$ of the lift-drag force vector $L_2$ and the tension strut force vector $M_2$ will act as a correcting force causing the assembly to move to the balanced position shown by solid lines. In this manner the new hydrofoil assembly will constantly seek the angle of incidence which produces the designed lift to drag ratio.

Consideration will now be given to the action of the hydrofoil assembly in automatically varying the dihedral angle to seek a position which is most efficient for stabilizing and supporting the watercraft under any given conditions. It will be apparent from the foregoing description of the invention that the forces imposed on the watercraft by the wind, weight distribution, etc. will be transmitted to the pivotal connections 35 by the support struts 24, 25, 28. The most efficient position of each hydrofoil assembly for resisting these forces is that in which the resultant lift force vector which the assembly applies to the pivot is equal and opposite to the support strut force vector applied by the boat to the pivot.

Figure 6:
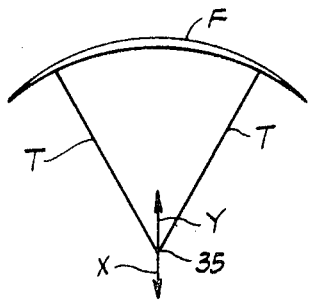
FIGURE 6 is a schematic illustration showing the hydrofoil assembly positioned dihedrally so that the force vectors applied through the pivot connection are balanced.
Figure 7:
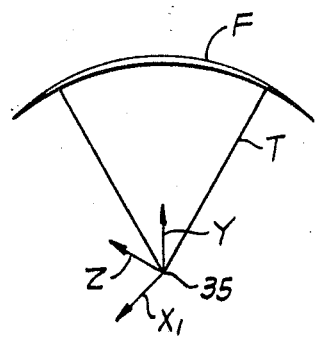
FIGURE 7 is a schematic illustration similar to FIG. 6, but showing unbalanced force vectors applied through the pivot point of the hydrofoil assembly.
Figure 8:
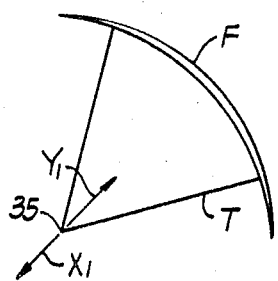
FIGURE 8 is a schematic illustration showing a change in the dihedral angle of the hydrofoil assembly to balance the force vectors.

In FIGURE 6 a hydrofoil assembly of the invention is schematically illustrated in a balanced condition. The force applied by the boat to the pivot 35, which force is designated by the force vector X, is balanced by the resultant lift vector Y which is equal and opposite to the vector X. Assuming now that the wind or other conditions cause a change in their effective direction of the force vector X applied by the boat to the pivot, as represented by $X_1$ in FIG. 7, an unbalanced resultant force Z is created. This unbalanced resultant force Z acts through the pivot and results in relative movement of the hydrofoil assembly to the position shown in FIG. 8 wherein the resultant lift force vector $Y_1$ is again equal and opposite to the force vector $X_1$. In this manner each hydrofoil assembly will assume the dihedral angle which is most efficient for the given conditions regardless of the point of sailing.

Figure 9:
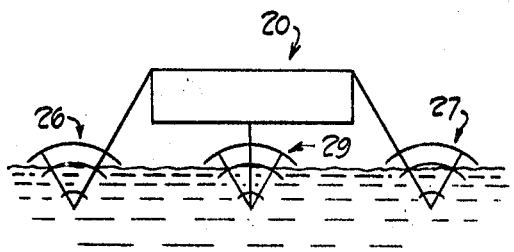
FIGURE 9 is a schematic, front elevational view of a sailing craft with the hydrofoil assembly in a balanced condition.
Figure 10:
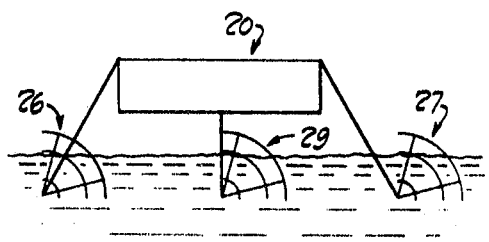
FIGURE 10 is a view similar to FIG. 9, but showing a change in the positions of the hydrofoil assemblies to balance side thrust forces.

As previously discussed, the hydrofoil assembly of this invention is particularly adapted for sailboats wherein it is necessary to resist leeway as well as heeling and pitching moments. Reference is now made to FIGS. 9–12 which schematically illustrate the actions of the new hydrofoil system applied to sailing craft. FIGURE 9 is a view showing the position of the craft 20 in the absence of any force tending to cause leeway or heeling or pitching moments. In this position the lift vector of each hydrofoil assembly forms an angle of 90° with a plane containing the dihedral pivot axis. If a side force acting from the right is now applied to the craft 20, each hydrofoil assembly will pivot about its dihedral axis in a windward direction in the manner described above in conjunction with FIGS. 6, 7 and 8. The dihedral angles will automatically change until the hydrofoil assemblies assume the positions shown in FIG. 10 wherein the resultant lift vectors are equal and opposite to the forces applied by the boat 20 to the pivots 35. In these positions the hydrofoil assemblies are most effective to counteract the forces tending to cause leeway.

Figure 11:
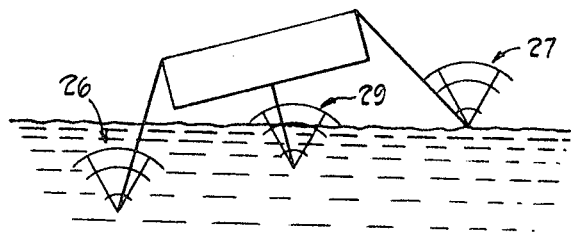
FIGURE 11 is a schematic, front elevational view of a sailing craft showing the positions of the hydrofoil assemblies in counteracting a heeling moment.

The action of the hydrofoil assemblies of the invention in resisting heeling moments is illustrated in FIG. 11. Assuming that a sudden heeling moment acting counterclockwise, as viewed in FIG. 11, is applied to the craft 20, the lee hydrofoil assembly 26 will be submerged to increase the foil area and concomitantly the lift force. The windward hydrofoil assembly 27 will move out of the water to decrease the foil area and the lifting force.

Figure 12:
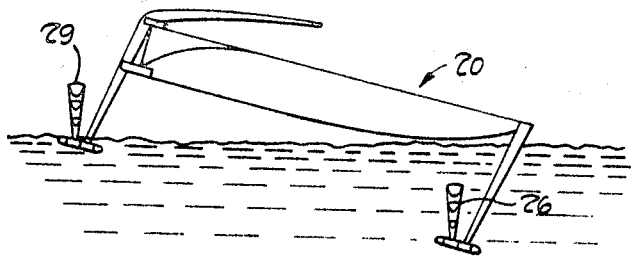
FIGURE 12 is a schematic side elevational view of a sailing craft showing the positions of the hydrofoil assemblies in counteracting a pitching moment.

Assuming a pitching moment, as shown in FIG. 12, the forward hydrofoil assemblies 26, 27 will submerge in the water to increase their lift force and, at the same time, will pivot to maintain the designed angle of incidence resulting in the optimum lift to drag ratio. The aft hydrofoil assembly 29 will be raised out of the water to decrease the foil area and its lifting force.

In summary of the foregoing, the invention provides a new hydrofoil assembly which includes at least one foil element mounted for pivotal movement about an effective pivot point located below the foil element, whereby the element can move to seek and maintain an angle of incidence which results in the designed lift to drag ratio. According to the preferred embodiment, the foil element also is free to move about a pivot point to seek a dihedral angle which is most efficient for stabilizing and supporting the watercraft. The construction of the new hydrofoil system is simple, inexpensive and does not restrict maneuvers. The efficiency and high performance of the new system make it particularly adapted for sailing craft which have a limited power supply. When applied to a sailboat, the self-stabilizing, automatically variable foil assemblies are effective to resist leeway, heeling and pitching moments which vary widely from one point of sailing to another and constantly change in magnitude depending upon the relative wind direction.

Another feature of the invention which will be apparent in that the struts 33, 34 act in tension rather than compression. Consequently, the struts connected to the foil elements can be smaller than conventional compression loaded struts and afford less drag and foil interference than conventional struts.

Figure 13:
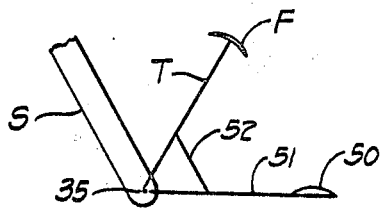
FIGURE 13 is a schematic, side elevational view of a modified embodiment of a hydrofoil assembly.
Figure 14:
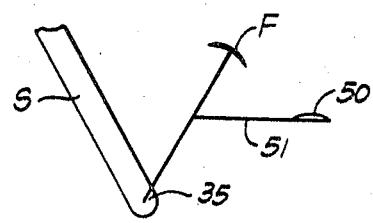
FIGURE 14 is a schematic, side elevational view of still another modified embodiment of a hydrofoil assembly.

Many variations of the new system also will be apparent. For example, as shown in FIG. 13, the new hydrofoil assembly may be comprised of one or more foil elements F attached to tension struts T pivoted at 35 to support struts F. A glider-like tail comprised of a foil element 50 carried by a strut 51 may extend from a pivot connection 35. As shown, the struts T and 51 are connected by a brace 52. In the embodiment of FIG. 14, the glider-like tail comprised of the foil element 50 and the supporting strut 52 is shown extending from an intermediate portion of the main tension strut 5. The tail shown in the embodiments of FIGS. 13 and 14 has a stabilizing effect and affords a stronger and faster response to forces tending to change the optimum angle of incidence. The tail can be formed to provide zero or positive lift.

Figure 15:
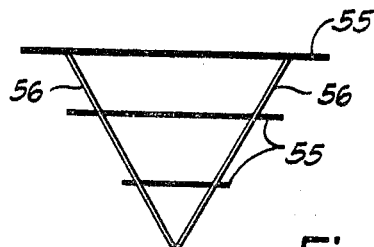
FIGURE 15 is a schematic, front elevational view of still another modified embodiment of the hydrofoil assembly.

Another suitable hydrofoil assembly is shown in FIG. 15. In the embodiment of FIG. 15, the assembly is comprised of a plurality of straight foil elements 55 which are connected by tension struts 56 that converge to a pivot point 57 located below the foil elements. This ladder-type foil arrangement is of the surface-piercing type and is ideally suited for carrying out the present invention.

Many other variations and modifications of the invention will be apparent to those skilled in the art in the light of the foregoing disclosure. Therefore, it is to be understood that, within the scope of the appended claims, the invention can be practiced otherwise than as specifically shown and described.

What is claimed is:

1. In a hydrofoil watercraft, the combination comprising a support member extending downwardly from said craft, and a hydrofoil assembly carried by said support member in position to be at least partially submerged when said craft is in motion, said assembly including a plurality of foil elements in a ladder form arrangement and means connecting said foil elements to said support member for pivotal movement in a direction fore and aft of said craft so that said elements can seek and maintain the designed angle of attack of said assembly.

2. The structure as claimed in claim 1 wherein said connecting means includes a tension strut attached to said foil elements and wherein said foil elements are connected to said support member by said tension strut for pivotal movement about an effective pivot point located below said foil elements.

3. In a hydrofoil watercraft, a balanced, self-correcting hydrofoil assembly comprising at least one foil element and means mounting said foil element for free pivotal movement about an effective pivot axis located below said element such that said assembly can seek and maintain a dihedral angle in which its resultant lift vector is equal and opposite to the force applied to said assembly by said craft, said mounting means including a tension strut attached to said foil element and means pivotally connecting said tension strut to said watercraft.

4. The structure as claimed in claim 3 wherein said watercraft includes a support member extending downwardly from said craft, said tension strut being pivotally connected to said member at a location normally below said element.

5. The combination as claimed in claim 3 wherein said hydrofoil assembly includes a glider tail.

6. The combination as claimed in claim 3 wherein said hydrofoil assembly includes a plurality of foil elements in a ladder form arrangement.

7. The combination as claimed in claim 6 wherein said foil elements have straight span axes.

8. The combination as claimed in claim 6 wherein said foil elements have upwardly convex span axes.

9. In a hydrofoil supported watercraft, a hydrofoil assembly comprising at least one foil element and means mounting said element for free pivotal movement so that said element can seek and maintain the designed angle of attack of said assembly and so that said foil element can seek and maintain a dihedral angle such that the resultant lift vector is equal and opposite to the force applied by said craft on said assembly, said mounting means including a tension strut attached to said foil element and means pivotally connecting said tension strut to said watercraft.

10. The structure as claimed in claim 9 wherein said element is mounted for movement about an effective pivot point normally located below said element.

11. In a hydrofoil supported watercraft, a hydrofoil assembly comprising at least one foil element and means mounting said element for free pivotal movement so that said element can seek and maintain the designed angle of attack of said assembly and so that said foil element can seek and maintain a dihedral angle such that the resultant lift vector is equal and opposite to the force applied by said craft on said assembly, said mounting means including a support member extending downwardly from said craft, a tension strut attached to and extending from said foil element, and means pivotally connecting one end of said tension strut to said support member.

12. The structure as claimed in claim 11 wherein said foil element is rigidly attached to said strut.

13. In a hydrofoil watercraft, the combination comprising support members extending downwardly from said craft and a hydrofoil assembly carried by each of said members, each of said assemblies including a plurality of foil elements, a tension strut attached to and extending from said elements, and means pivotally connecting said tension strut to its support member for pivotal movement about an effective pivot point located below said elements so that each said assembly can seek and maintain a position wherein the resultant lift vector of the assembly is equal and opposite to the force applied by the craft to the assembly through its support member.

14. In a hydrofoil watercraft, the combination comprising a support member connected to said craft, and a hydrofoil assembly including a foil element and a tension strut attached to and extending from said foil element, and means connecting said tension strut to said support member for pivotal movement about an effective pivot axis located below said foil element.

15. The combination as claimed in claim 14 wherein said foil element is rigidly attached to said tension strut.

16. In a hydrofoil watercraft, the combination comprising a support member extending downwardly from said craft, an elongated tension strut, a foil element rigidly attached to said tension strut, and means pivotally connecting said tension strut to said support member at a location located below said foil element.

References Cited

UNITED STATES PATENTS 942,687 12/1909 White.

FOREIGN PATENTS 34,042 11/1934 Netherlands.
924,374 4/1963 Great Britain.

ANDREW H. FARRELL, Primary Examiner